Aug. 29, 1933. L. G. M. TIMPSON 1,924,889
TIME CONTROLLED MECHANISM
Filed Oct. 8, 1928
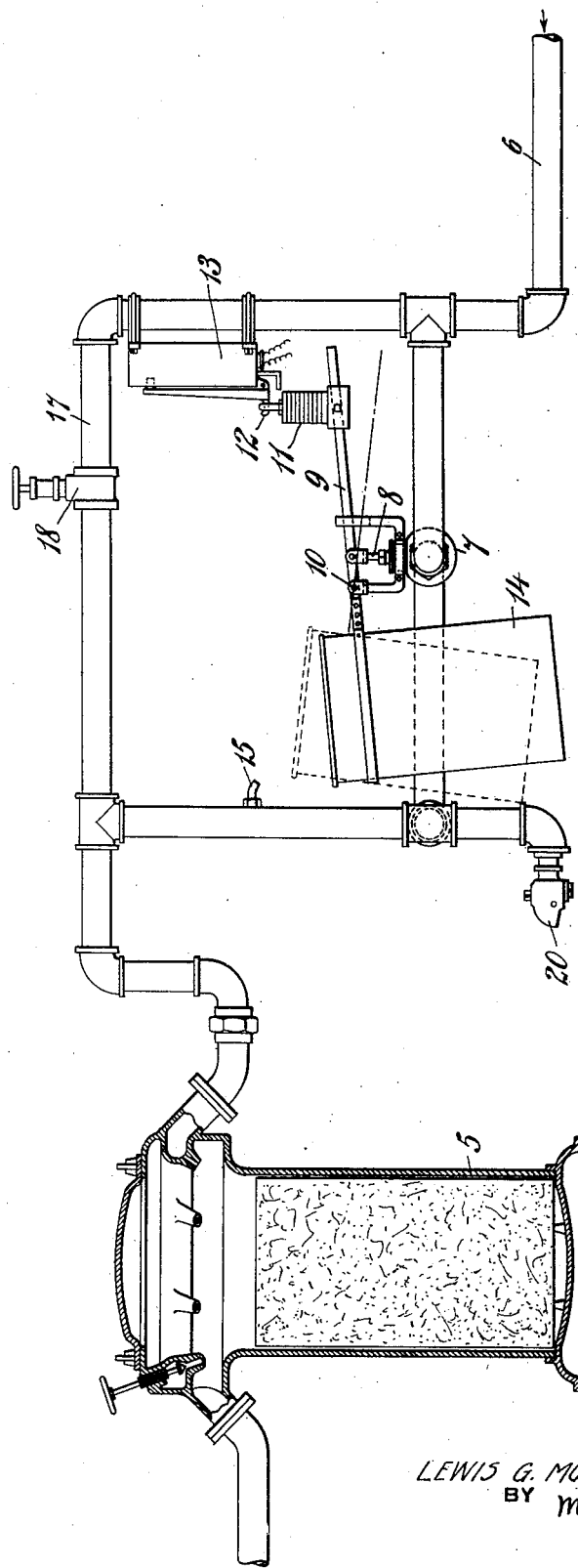
INVENTOR
LEWIS G. MORRIS TIMPSON
BY Maxwell Barns
ATTORNEY Patented Aug. 29, 1933

1,924,889

UNITED STATES PATENT OFFICE 1,924,889

TIME CONTROLLED MECHANISM

Lewis G. Morris Timpson, Plainfield, N. J., assignor to Pyrene-Minimax Corporation, a corporation of Delaware Application October 8, 1928. Serial No. 310,989

3 Claims. (Cl. 169—15)

The present invention relates to fire fighting apparatus and has for an object to provide an improved arrangement for permitting flow of water for a predetermined time and then automatically shutting off the flow.

The invention will be better understood from a description of a particular illustrative embodiment thereof but it will be understood that the description of the particular apparatus is illustrative merely and is not intended as defining the limits of the invention. Referring to the accompanying drawing.

Figure 1 is a diagrammatic view of an apparatus embodying the invention.

The apparatus selected for a particular description to illustrate the principles of the invention comprises a foam generator 5 which may be of any desired type, such for example as that illustrated in application Serial Number 282,341 filed by Wilhelm Graaf on June 2, 1928, and an arrangement whereby in case of fire the flow of water will be initiated either automatically or manually and after a predetermined time will be automatically discontinued. As shown, a conduit 6 supplies water through a valve 7 to the foam generator 5. The stem 8 of the valve 7 is connected to an operating lever 9 pivoted at 10. A weight 11 at one end of the lever may tilt the lever to open the valve. This weight is temporarily supported by or on a hook 12 to hold the lever 9 in valve closing position, but said weight may be released in any suitable way as, for example, by means of an electro-magnet 13 controlling the hook 12.

At the opposite end of the lever 9 means is provided for automatically rocking the lever to valve closing position after a predetermined period of time, the time being adjusted to permit the desired amount of water to flow through the foam generator 5.

As shown a tank is so arranged that it will receive a relatively small stream of water from the delivery side of the valve 7 when the valve is open and as the tank fills to a predetermined point it will cause a closing of the valve 7. In the particular structure shown the tank is carried by the lever 9 in position to receive a stream of water from the nozzle 15, the tank full of water thus acting as a weight opposing the action of the weight 11 to close the valve.

In order that the tank may not be filled by the drip from the nozzle 15 in case of leakage, said nozzle is positioned at one side of but not directly above the tank 14 and it lies at an angle such that when there is substantial pressure in the conduit a stream of water issuing from the nozzle will be projected into said tank.

A branch pipe line or by-pass 17 controlled by a hand valve 18 may be provided to permit flow of water around the automatic valve 7 as occasion may require. A drip valve 20 may be provided if desired.

The foam generator 5 may be of any desired type but is shown as carrying a charge of powder and having a plurality of nozzles directing the stream of water from its inlet onto said charge of powder. It will be understood that this type of apparatus may be effectively used to form foam for a predetermined time or until the charge of powder is exhausted.

Variations in the embodiment shown and other applications of the principles of the invention may be developed without departing from the spirit of the invention.

I claim:—

1. In apparatus of the character described, in combination a foam generator adapted to contain a predetermined quantity of chemicals, a conduit for supplying a stream of water to said generator, a valve controlling the flow of water in said conduit, means for opening said valve and means for thereafter closing said valve comprising a tank and means for admitting a stream of water to said tank discharging a quantity proportionate to that flowing through said conduit to said generator while the valve is open and water is flowing in said conduit, said tank being so constructed and arranged as to be shifted upon opening and closing said valve closing of said valve taking place automatically in response to the shifting of said tank when a predetermined weight of water has collected in said tank and a quantity proportionate to said quantity of chemicals has been supplied to said generator.

2. In apparatus of the character described, in combination, a foam generator adapted to contain a predetermined quantity of chemicals, a conduit for supplying a stream of water to said generator, a valve controlling the flow of water in said conduit, means for opening said valve and means for closing said valve comprising a balance arm operatively connected with said valve, a tank carried by said arm, means for applying a force to said arm to overbalance said tank, and outlet means constructed and arranged to provide a limited flow of water, in a quantity proportionate to that supplied to said generator, from the delivery side of said valve to said tank, provision being made for closing said valve by said balance arm when a predetermined weight of water has collected in said tank and a quantity proportionate to said quantity of chemicals has been supplied to said generator.

3. In apparatus of the class described a foam generator adapted to contain a predetermined quantity of foam producing chemicals, a conduit adapted to supply water to said generator for reaction with said chemicals, a valve in said conduit, and means including a balance arm operatively connected with said valve for automatically controlling said valve to supply a quantity of water proportionate to said quantity of chemicals, said means comprising normally ineffective means for applying a force to said arm to open said valve, a device adapted to be controlled from a remote point for rendering said valve opening means effective, and means including a tank mounted on said arm and adapted to receive a shunted stream of water from said conduit in a quantity proportionate to that supplied to said generator for closing said valve in opposition to said normally ineffective means after the desired quantity of water has been supplied.

LEWIS G. MORRIS TIMPSON.